United States Patent
Aweya

(10) Patent No.: US 9,665,121 B2
(45) Date of Patent: May 30, 2017

(54) METHOD AND DEVICES FOR TIME TRANSFER USING PEER-TO-PEER TRANSPARENT CLOCKS

(71) Applicants: Khalifa University of Science, Technology, and Research, Abu Dhabi (AE); British Telecommunications plc, London (GB); Emirates Telecommunications Corporation, Abu Dhabi (AE)

(72) Inventor: James Aweya, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 214 days.

(21) Appl. No.: 14/566,951

(22) Filed: Dec. 11, 2014

(65) Prior Publication Data

US 2016/0170439 A1   Jun. 16, 2016

(51) Int. Cl.
*G06F 1/12* (2006.01)
*H04L 29/06* (2006.01)
*G06F 1/10* (2006.01)

(52) U.S. Cl.
CPC .................. *G06F 1/12* (2013.01); *G06F 1/10* (2013.01); *H04L 69/28* (2013.01)

(58) Field of Classification Search
CPC ....................................................... G06F 1/04
See application file for complete search history.

(56) References Cited

U.S. PATENT DOCUMENTS

| 8,718,482 | B1 | 5/2014 | Roberts |
| 8,873,589 | B2* | 10/2014 | Aweya ................. H04J 3/0667 |
| | | | 370/503 |
| 8,959,381 | B2* | 2/2015 | Aweya ..................... G06F 1/04 |
| | | | 709/203 |
| 2013/0080817 | A1* | 3/2013 | Mihelic ................ H04J 3/0667 |
| | | | 713/401 |

(Continued)

OTHER PUBLICATIONS

Practical Considerations in the Design and Implementation of Time Synchronization Systems Using IEEE 1588, Jiho Han and Deog-Kyoon Jeong, Seoul National University, Nov. 2009.

(Continued)

*Primary Examiner* — Kim Huynh
*Assistant Examiner* — Eric Chang
(74) *Attorney, Agent, or Firm* — Calfee, Halter & Griswold, LLP

(57) ABSTRACT

This invention relates to methods and devices for time synchronization. The invention has particular application in the alignment of slave clocks to a master clock and in dealing with packet delay variation and dynamic asymmetries in the network links between them. In embodiments of the invention, the slave clock uses the peer link delay and residence times measured by peer-to-peer transparent clocks to compensate for clock synchronization errors that arise due to variability in message transfer delays. Embodiments provide a simple linear approximation technique and a Kalman filter-based technique for estimating offset and skew of the slave clock.

12 Claims, 6 Drawing Sheets

(56) References Cited

U.S. PATENT DOCUMENTS

2013/0182806 A1* 7/2013 Obradovic ................ H04L 7/04
375/356

OTHER PUBLICATIONS

A New Time Synchronization Method for Reducing Quantization Error Accumulation Over Real-Time Networks: Theory and Experiments, Xiong Xu, Student Member, IEEE, Zhenhua Xiong, Member, IEEE, Xinjun Sheng, Member, IEEE, Jianhua Wu, Member, IEEE, and Xiangyang Zhu, Member, IEEE; IEEE Transactions on Industrial Informatics, vol. 9, No. 3, Aug. 2013.
New Algorithm for IEEE 1588 Time Synchronization Under the Presence of Significant Delay Variation, Pengfei Yang, Hao Tang, Xue Chen, Minghao Tian, State Key Laboratory of Information Photonics and Optical Communications, Beijing University of Posts and Telecommunications, P.O. Box 128, #10 XiTuCheng Road, HaiDian District, Beijing, China 100876; 2013.
International Search Report, PCT/GB2014/053675, Sep. 10, 2015.
Written Opinion, PCT/GB2014/053675, Sep. 10, 2015.
ITU-T Recommendation G.8275.1/Y.1369.1, Precision Time Protocol Telecom Profile for Time/Phase Synchronization, Mar. 2014.
R. E. Kalman, "A New Approach to Linear Filtering and Prediction Problems," Transaction of the ASME—Journal of Basic Engineering, Mar. 1960, pp. 35-45.
C. D. Pack and B. A. Whitaker, "Kalman Filter Models for Network Forecasting," The Bell System Technical Journal, vol. 61, No. 1, Jan. 1982, pp. 1-14.

* cited by examiner

METHOD AND DEVICES FOR TIME TRANSFER USING PEER-TO-PEER TRANSPARENT CLOCKS

FIELD OF THE INVENTION

The present invention relates to methods and devices for time transfer using Peer-to-Peer transparent clocks. It is particularly, but not exclusively, concerned with methods and devices which make use of the peer delay recorded by the transparent clocks.

BACKGROUND OF THE INVENTION

IEEE 1588 PTP is now the industry accepted packet-based method/standard for distributing timing information from a master to enable the clocks of distributed systems to be synchronized with high precision (in the nanosecond levels). It is also designed for applications that cannot bear the cost of a GPS receiver plus antenna at each node, or for which GPS signals are inaccessible.

IEEE1588 PTP is a two-way time transfer protocol wherein a GrandMaster clock is synchronized to a high-quality source such as GPS and then generates packets with precise timestamps that are sent downstream to slave devices. The slave devices use these timestamps as well as a delay measurement mechanism and message exchanges in order to derive the clock that is supplied to equipment requiring synchronization. Devices between the master and slave clocks may be ordinary switches and routers, or specialized equipment with on-path support, such as Boundary Clocks (BCs) and Transparent Clocks (TCs), that are intended to mitigate the effects of timing impairments introduced by the network between the master and slave.

A complete IEEE 1588-based solution includes servo (control) algorithms, filters, and PTP-clock based on hardware timer and direct timer access. The IEEE 1588 standards define a wide range of synchronization capabilities except the clock recovery mechanisms (servo algorithm, PLL, timers, etc.) to be used at the receiver (slave) to synchronize its local clock to the master. The last pieces are vendor and proprietary solutions and are often product differentiators.

Synchronization with On-Path Timing Support (ITU-T Rec. G.8275.1)

On a PTP network, frequency and time/phase (from hereon called "time" for simplicity) is distributed from a PTP master and recovered at a slave device for use by remote network equipment. The packet network between master and slave may include a number of switches or routers, which handle normal data traffic in addition to PTP traffic.

Traffic congestion, queuing effects, and quality of service (QoS) control mechanisms in the packet network between the master and slave device can cause a timing impairment such as packet delay variation (PDV), as well as delay asymmetry. PDV is the variability of delay that packets experience due to queuing and traffic conditions in the network. Delay asymmetry may be caused by a number of factors:

- Different physical medium path lengths, that is, transmit/receive path differences introduced by actual fiber path differences in fiber networks or different modulation formats in microwave (MVV) and millimeterwave (MMW) links
- Dynamic delay differences (queuing, congestion) between transmit and receive paths. This includes queuing and forwarding delays in network processors, traffic managers, and switch fabrics
- Different network paths for transmit and receive
- Rate-adaptation in the network element (as in MW and MMW base stations, DSL/GPON systems, etc.). Access technologies (like DSL) have large PDVs because of the modems adaptive transmission features to cope with line conditions. Adaptive modulation schemes in MW and MMW modems for various weather conditions further lead to large changes in link delays, possibly even asymmetric.
- I/O serialization delays and speed mismatches This variation in delay and any asymmetry affects the quality of synchronization of the slave device. If the delay path is not symmetric, then an error in the time synchronization occurs unless the level of asymmetry is known and compensated for. It is important to emphasize that any uncompensated asymmetry in the network will directly translate to errors in the time/phase derived from the IEEE 1588 ordinary slave clock.

BCs and TCs are PTP-aware switches that provide the on-path support required to reduce the effect of PDV and delay asymmetry on a synchronization network. Networking equipment such as switches and routers may be equipped with on-path support that enable them to reduce the negative effects of PDV on a synchronization network. On-path support attempts to improve both frequency and time synchronization by minimizing or eliminating transit (dynamic) delay asymmetry in the network element, and minimizing or eliminating transit delay variation (PDV) in the network element.

There are two forms of on-path support considered in PTP (IEEE-1588):

Boundary Clock: A BC "regenerates" the timing flow. That is, a BC appears as a slave to the upstream master and synchronizes its time-clock to that master. The BC appears as a master to downstream slaves and thereby transfers its time-clock downstream. Note that a BC cannot mitigate the time error introduced by the asymmetry in the transmission medium either upstream or downstream.

BCs are PTP devices that may be positioned at a network boundary such as subnet boundary, provider edge or anywhere that a router would typically be employed. A BC has one slave port, which is connected to a Grand Master clock through the network, and it derives its frequency and time synchronization from this slave port.

The BC also has one or more master ports that are connected to slaves downstream. Sync and Follow-up packets are received on the slave port, and then the BC creates new Sync and Follow-up packets that are sent to the slave devices connected to its master ports. The timestamps included in these outgoing packets are generated by the BC using its internal PTP implementation.

Transparent Clock: A TC acts "invisibly to the master and slave from a synchronization perspective" by providing a timestamp correction term to PTP event messages traversing the TC. There are two forms of transparent clocks. The end-to-end (E2E) TC provides a correction that reflects the residence time (or dwell-time) of the packet within the equipment itself. A peer-to-peer (P2P) TC includes in the correction its own internal delay as well as an estimate of the link delay between itself and its upstream device. Neither type of TC can mitigate the time error resulting from asymmetry in the transmission medium.

TCs are PTP devices that operate as normal switches, but they update the correction field of the PTP packets with a value equal to their residence time, that is, the time the packet was delayed in the switch (E2E TCs), or the residence time plus the peer link delay (P2P TCs). The purpose of the TC function providing on-path support is to remove the effect of PDV by informing downstream devices of precisely what these delays were on a packet-by-packet basis.

In order to make the time synchronization as accurate as possible it is important that the timestamps are as accurate as possible and that the path delay is symmetrical. BCs and TCs can be used in a network to mitigate dynamic measurable delay asymmetries but not static (fixed) asymmetries. Although BCs and TCs cannot mitigate the time error resulting from asymmetry in the transmission medium, the use of PTP allows for the compensation of known and static asymmetry in the path delays. But this of course requires that the asymmetry to be known, and that the asymmetry can be measured and is not variable so that it can be effectively compensated.

Static asymmetries could potentially be physically measured, and therefore be compensated for in software. Variable delays can be corrected in hardware on a packet-by-packet basis (using TCs). PTP on-path support in networks can largely eliminate time errors introduced by the above impairments by proper implementation of I/O-level timestamping and the use of (distributed) TCs everywhere with limited deployments of BCs for scaling purposes.

Synchronization using IEEE 1588 PTP

The IEEE 1588v2 PTP defines a packet-based synchronization protocol for communicating frequency, phase and time-of-day information from a master to one or more slaves with sub-microsecond accuracy. PTP relies on the use of accurately timestamped packets (at nanosecond level granularity) sent from a master clock to one or more slave clocks to allow them to (frequency or time) synchronize to the master clock. Synchronization information is distributed hierarchically, with a GrandMaster clock at the root of the hierarchy.

The GrandMaster provides the time reference for one or more slave devices. These slave devices can, in turn, act as master devices for further hierarchical layers of slave devices. PTP provides a mechanism (i.e., Best Master Clock Algorithm) for slave clocks to select the best master clock in their respective synchronization domain. The selection is performed according to the PTP attributes of the GrandMaster (e.g. PTP priority, clock class).

The GrandMaster is the root timing reference in a domain and transmits synchronization information to the clocks residing in its domain. In IEEE 1588v2 PTP messages are categorized into event and general messages. All IEEE 1588 PTP messages have a common header. Event messages are timed messages in that an accurate timestamp is generated at both transmission and receipt of each message. Event messages have to be accurately timestamped since the accuracy in transmission and receipt timestamps directly affects clock distribution accuracy. A timestamp event is generated at the time of transmission and reception of any event message. General messages are not required to be timestamped. The set of event messages consists of Sync, Delay_Req, Pdelay_Req, and Pdelay_Resp. The set of general messages consists of Announce, Follow_Up, Delay_Resp, Pdelay_Resp_ Follow_Up, Management, and Signaling.

IEEE 1588 PTP allows for two different types of timestamping methods, either one-step or two-step. One-step clocks update time information within event messages (Sync and Delay-Req) on-the-fly, while two-step clocks convey the precise timestamps of packets in general messages (Follow_Up and Delay-Resp). Each broadcast begins at time $T_1$ with a Sync message sent by the GrandMaster to all the clocks in the domain. A clock receiving this message takes note of the local time $T_2$ when this message is received. The master may subsequently send a multicast Follow_Up with accurate $T_1$ timestamp.

Peer-to-Peer (P2P) Transparent Clock

An End-to-End (E2E) TC is a multi-port device that is not a master or slave clock but a bridge between the two. E2E TCs only measure the time taken for a PTP event message (Sync and Delay_Req) to transit the bridge and provide this information to the receiving clocks in the correction field. No propagation delay of the link connected to the port is corrected by the E2E TC. E2E TCs use the delay request/delay response mechanism for the delay measurement whereby the residence time of the delay request/delay response messages are corrected in the same way stated above.

A P2P TC 6 is also a multi port device that is not a master or slave clock but a bridge between the two. This clock determines the residence time of a Sync message through the switch. It also determines the inbound path (link) delay as measured using the peer delay mechanism. Both values are added up and placed in the correction field of the Sync message or associated Follow_Up message as illustrated in FIG. 1.

A PTP message arriving at the ingress port 61 is detected and timestamped by the local clock 62. The Correction Field of the arriving PTP message is read out. The P2P TC 6 calculates the link delay upstream of the P2P TC. When the PTP message reaches the egress port 63 of the TC, an egress timestamp is produced by the local clock 62. The P2P TC 6 calculates the difference between the ingress timestamp and the egress timestamp and adds the calculated link delay. This gives the residence time in the P2P TC along with the upstream peer link delay. The Correction Field is then updated by adding this value to the existing value of the Correction Field and updating the Correction Field in the outgoing PTP message accordingly.

In the end-to-end approach, delay measurement messages (Sync, Follow_Up, Delay_Req, and Delay_Resp messages) are exchanged between the master and the slave using the delay request-response measurement mechanism. In peer-to-peer networks (i.e., networks with P2P TCs) the master still sends Sync and Follow_Up messages to the slave clock just as in the end-to-end approach. A P2P TC forwards and modifies Sync and Follow_Up messages only to compensate for residence time and peer uplink delay as shown in FIG. 2. A one-step P2P TC updates for switch delay in Sync messages as they pass through the switch while a two-step TC updates a field in the non time-critical general message (Follow_Up).

The upstream link delay is the estimated packet propagation delay between the upstream neighbor P2P TC and the P2P TC under consideration. The correction field of the message received by the slave contains the sum of all residence times and link delays. In theory this is the total end-to-end delay (from master to slave) of the Sync packet, except for the delay between the last P2P TC and the slave which is added by the slave as discussed below.

P2P TCs use the following event messages for peer delay measurements: Pdelay_Req Pdelay_Resp, and Pdelay_Resp_Follow_Up. These messages are sent in the sequence shown in FIG. 3. In the peer-to-peer approach, each device on the network exchanges peer-delay measurement messages. This allows each device to keep track of the delays between itself and its immediately connected neighbors.

Each device periodically initiates an exchange of peer-delay messages on every connected port. The peer delay mechanism measures the port-to-port propagation time, i.e., the link delay, between two communicating ports supporting the peer delay mechanism. The link delay measurements are made independently by each port implementing the peer delay mechanism. This means that the link delay is known by ports on both ends of a link. This allows path length corrections to be made immediately upon reconfiguration of the network.

With this requirement and given two P2P TCs, TC1 and TC2 (FIG. 3), TC1 (upstream) initiates the peer delay mechanism to TC2 (downstream). Similarly, TC2 initiates an independent peer delay mechanism to TC1. TC2 initiates the same series of messages in the reverse direction so that both clocks know the peer-delay. However, TC2 is the TC (and not TC1) that updates the peer link delay in the Sync (or Follow_Up) message for the peer link under consideration. This is to avoid double link delay updating for a peer link under consideration. At the end of this PTP message exchange, the downstream P2P TC possesses all four timestamps $\{T_{p1}, T_{p2}, T_{p3}, T_{p4}\}$. These timestamps are then used to compute the upstream link delay.

In a peer-to-peer network, all links are periodically measured, so the delay between the master and slave are readily known when the network path/topology changes. Note that peer-delay messages are exchanged even on ports blocked to prevent loops, such as by the Rapid Spanning Tree Protocol.

As the process in FIG. 2 continues hop by hop (where N is the number of hops or links), the Sync or Follow-Up Messages maintain a running total of the residence and propagation times; resulting in a grand total delay value from master to slave:

$$\text{total\_residence\_time\_plus\_propagation\_delay} = d_{total} = \sum_{i=1}^{N-1} r_i + \sum_{i=1}^{N} p_i \quad (1)$$

Upon receipt of the final Sync or Follow-Up Message, the slave device calculates its offset. It is noted here that although the sum of the propagation and residence delays at each TC (p1, r1, p2, r2, . . . ) is included in the Sync message's associated Follow-Up's offset correction field, the final propagation delay from the last TC to the slave device must be included in order to fully capture the end-to-end delay as shown FIG. 2.

Time transfer using P2P TCs involves using the residence plus total propagation delay (in P2P TCs) at slave to mitigate PDV effects as illustrated in FIG. 4 which shows the passage of PTP timing messages 21 over a packet network 2 from a PTP master 1 having a reference clock 4 to a PTP slave 3 having a slave clock 5. P2P TCs 6 in the network 2 calculate the peer link delays and residence times for each portion of the journey except the final leg to the slave device 3. The IEEE 1588 does not describe how this should be done but left to vendor/user implementation. The standard does not specify how the clock recovery mechanism at the receiver should be implemented. The technique proposed in this document is one such mechanism for time recovery at a slave using the information accumulated in the correction field of the Sync or Follow_Up messages.

In FIG. 5, the transparent clock devices on the communication path to each slave measure the peer link delay and the delay the Sync packet resides in the TC device and increments the correction field in the PTP header. By doing so, the slave clock or boundary clock further down the line can determine how long the Sync packet resided in the TC devices before it. The slave can then use the values in the correction field to reduce the effects PDV on its path.

Consider the case where a TC contains a free-running oscillator with frequency accuracy no worse than ±100 ppm. If residence time is measured using this oscillator, there will be an error on the order of the residence time multiplied by the actual frequency offset. Optimum synchronization performance is obtained when all TCs on a synchronization path are frequency locked (syntonized) to the master clock. If a TC is not frequency synchronized to the GM, a TC with a ±100 ppm accuracy will contribute a measurement error of ±(0.0001×10 ms)=±1 μs (or ±1000 ns) to the residence time if the ideal residence time is 10 ms. A good thing is that oscillators do not typically operate at the extreme ends of their accuracy limits.

To reduce this error, IEEE 1588 Version 2 allows the TC to be syntonized, i.e., synchronized in frequency, to the GM. Each TC will use its own internal mechanisms to measure frequency offset relative to the GM and to synthesize a frequency signal that is syntonized with the GM. This synthesis may be done via hardware, firmware, or software.

Assume a network with nodes having standard Ethernet oscillators, with nominal rates of 25 MHz for 100 Mbit/s Ethernet and 125 MHz for 1 Gbit/s Ethernet. This means that the phase measurement granularity in the TC and ordinary clock can be as much as 40 ns. Additional phase error will result from the variable component of latency in the Ethernet physical layer (PHY) (the fixed component can be specified by the manufacturer in the design).

Consider the case of a syntonized TC local oscillator. If the frequency offset between the GM and TC oscillator is measured and a syntonized frequency is created, the use of this frequency for the TC delay computation will greatly reduce the magnitude of the TC measurement errors. The phase step magnitude will now be on the order of the syntonized frequency measurement accuracy multiplied by the synch interval. For example, if the phase measurement granularity is 40 ns (assuming a 25 MHz oscillator for 100 Mbit/s Ethernet) and the TC oscillator frequency offset is measured/syntonized over 100 ms, then the measured frequency offset is $40 \times 10^{-9}$ s/0.1 s=$400 \times 10^{-9}$=0.4 ppm (parts-per-million). The TC measurement error or offset now is $(400 \times 10^{-9})(0.01$ s$)$=4 ns, i.e., the TC measurement error is reduced from the 1000 ns computed when the free-running local oscillator is used for the measurement by a factor of 250. In practice, the reduction will not be this large because other effects are present, e.g., oscillator phase noise and drifts due to temperature effects, phase measurement error due to the variable portion of the PHY latency, and frequency measurement granularity.

Thus, to conclude, the timing options available for TC for delay measurements are:
  Both E2E and P2P TCs: A TC uses a local free-running oscillator embedded in the TC
  Both E2E and P2P TCs: A TC uses a signal that is syntonized to the GM
  P2P TCs Only: A TC uses a signal that is time synchronized to the GM. The TC computes a time offset which it uses to align its clock.

For most accurate residence time measurements, the PTP clocks in each TC should be syntonized with the GM. Syntonization only requires correction to the TC oscillator frequency. The TC host processor can use the ingress timestamps from Sync messages to determine a frequency (rate) correction required for the PTP clock. Alternatively, syntonization may be handled on the TC host processor without adjusting the frequency of the TC clocks. The frequency correction may be used to modify the computed residence times inserted into Follow_Up and Delay_Resp messages. This method may not be used with one-step operation.

The present invention aims to provide methods and devices which improve on the estimations of skew and offset of a slave clock where timing messages have passed through one or more peer-to-peer transparent clocks on the path from the master to the slave.

SUMMARY OF THE INVENTION

An exemplary embodiment of the invention provides a method for estimating the skew and offset of a slave clock in a slave device in relation to a master clock in a master device, the slave device and the master device being connected by a network, the method including the steps of: sending timing messages from the master device to the slave device over the network, each timing message passing through at least one peer-to-peer transparent clock; recording timestamps which are the times of the sending and receiving said messages according to the respective clocks; in each transparent clock, estimating the residence time of each message passing through the transparent clock and the propagation delay between the sending of the message by the previous transparent clock, or the master device if there is no previous transparent clock, and the receipt of the message by the transparent clock; communicating said residence time and time delay to the slave device; estimating the skew and offset of the slave clock using the said timestamps, said residence times and said propagation delays.

A further exemplary embodiment of the invention provides a slave device connected to a master device having a master clock by a network, the slave device having a slave clock and a processor, the slave device being arranged to: receive timing messages from the master device over the network, each timing message passing through at least one peer-to-peer transparent clock; record timestamps which are the times of the sending and receiving said messages according to the respective clocks; extract from each message a peer delay which is the cumulative estimate by the transparent clocks of the residence time of the message passing through each transparent clock and the propagation delay between the sending of the message by the previous transparent clock, or the master device if there is no previous transparent clock, and the receipt of the message by the transparent clock, wherein: the processor is arranged to: estimate the skew and offset of the slave clock compared to the master clock using said timestamps and said peer delay.

A further exemplary embodiment of the invention provides a system including: a master device having a master clock; a slave device having a slave clock and a processor; and a network connecting said master device and said slave device and having at least one peer-to-peer transparent clock, wherein the slave device is arranged to: receive timing messages from the master device over the network, each timing message passing through at least one peer-to-peer transparent clock; record timestamps which are the times of the sending and receiving said messages according to the respective clocks; the transparent clock is arranged to: estimate the residence time of each message passing through the transparent clock and the propagation delay between the sending of the message by the previous transparent clock, or the master device if there is no previous transparent clock, and the receipt of the message by the transparent clock; and communicate said residence time and said propagation delay to the slave device, and the processor is arranged to: estimate the skew and offset of the slave clock compared to the master clock using said timestamps and said peer delay.

BRIEF DESCRIPTION OF THE DRAWINGS

Embodiments of the invention will now be described by way of example with reference to the accompanying drawings in which.

DETAILED DESCRIPTION

Figure 1:
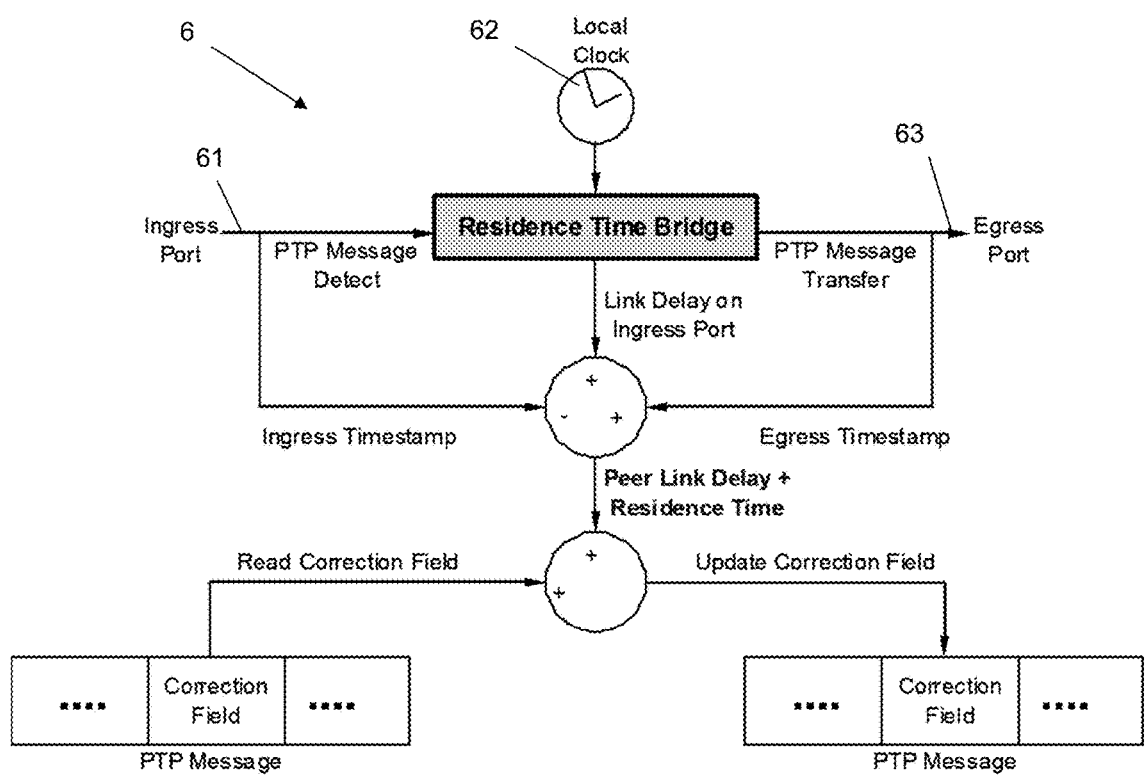
FIG. 1 shows how a Peer-to-Peer transparent clock updates the correction field and has already been described.
Figure 2:
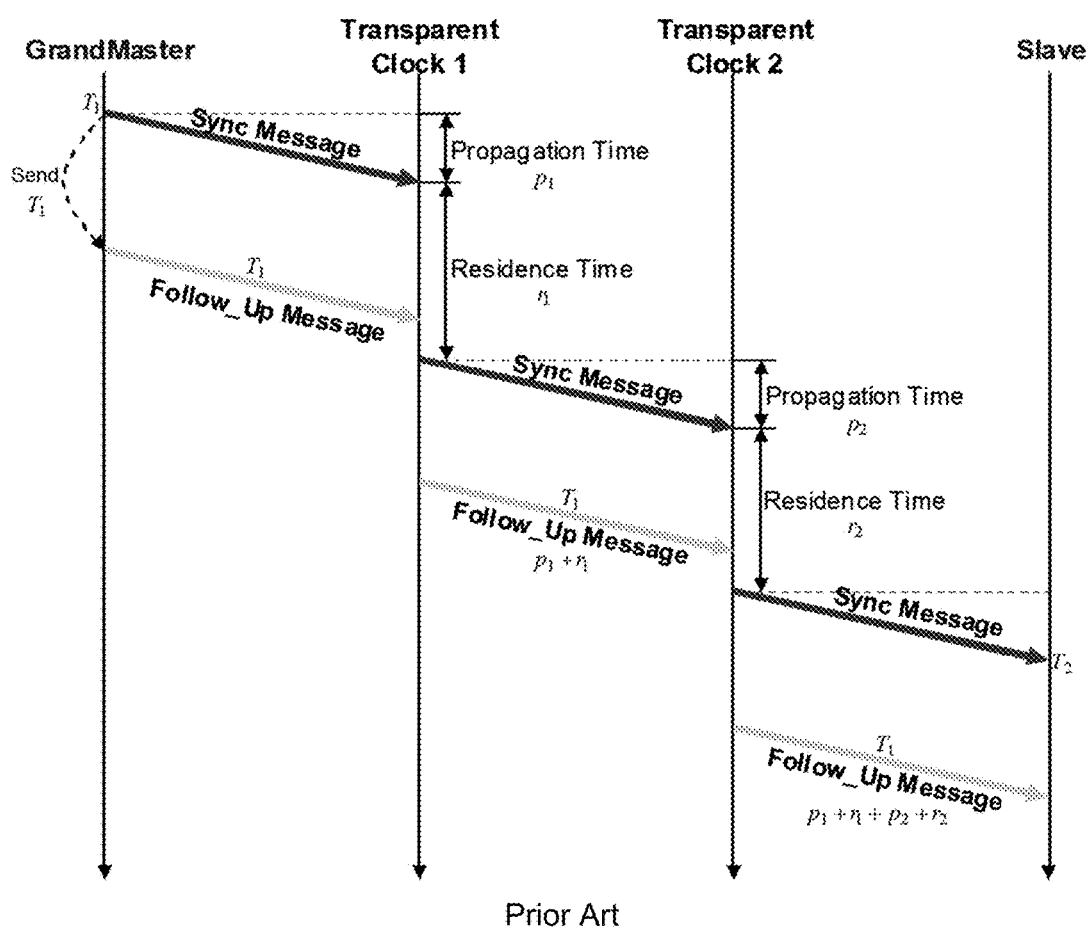
FIG. 2 shows the PTP message flow through Peer-to-Peer transparent clocks and has already been described.

At their broadest, aspects of the present invention provide for methods and devices for estimating skew and offset in a slave device where timing messages from the master device have passed through at least one peer-to-peer transparent clock, which make use of the peer delay estimated by the or each transparent clock A first aspect of the present invention provides a method for estimating the skew and offset of a slave clock in a slave device in relation to a master clock in a master device, the slave device and the master device being connected by a network, the method including the steps of: sending timing messages from the master device to the slave device over the network, each timing message passing through at least one peer-to-peer transparent clock; recording timestamps which are the times of the sending and receiving said messages according to the respective clocks; in each transparent clock, estimating the residence time of each message passing through the transparent clock and the propagation delay between the sending of the message by the previous transparent clock, or the master device if there is no previous transparent clock, and the receipt of the message by the transparent clock; communicating said residence time and time delay to the slave device; estimating the skew and offset of the slave clock using the said timestamps, said residence times and said propagation delays.

This method can make use of the on-path timing support provided in the form of peer-to-peer transparent clocks which estimate or measure actual timing packet delays and communicate these delay measurements to slaves. The slave can then correctly adjust its clock while compensating for the actual delay variations. This may allow the slaves to remove the negative effects that these delay variations cause in clock synchronization.

Thus this method may improve time distribution accuracy by allowing slave devices to compensate for the message delivery variability across the network by using the recorded residence time(s) and propagation time delay(s) as calculated by the peer-to-peer transparent clock(s) when estimating the skew and offset.

The method may further include the step of synchronizing the output of the slave clock to the master clock using said estimated offset and skew. By using peer link delay and PTP message residence time measurements obtained by P2P TCs, very accurate clock synchronization may be achieved, possibly to levels comparable to GPS.

In certain embodiments, the step of estimating the skew and offset uses an exponentially weighted moving average filter applied to said timestamps and said residence times.

For example, the step of estimating the skew and offset may estimate the skew $\alpha$ as $$\alpha = \frac{(T_{1,n} - T_{1,n-1}) + (d_{total,n} - d_{total,n-1})}{(T_{2,n} - T_{2,n-1})} - 1$$

wherein: $T_{1,n}$ is the time of departure of the nth timing message as measured by the master clock; $T_{2,n}$ is the time of receipt as recorded by the slave clock on receipt of the nth timing message; $d_{total,n}$ is the total transit delay experienced by the nth timing message, being the total of all the residence times experienced in the transparent clocks and all of the measured propagation delays determined by the transparent clocks, estimate the offset $\theta$ as $\theta = (T_{1,n} + d_{total,n}) - (1+\alpha)T_{2,n}$, and update the offset and skew according to the update equations: $\hat{\alpha}_n = \mu\alpha_n + (1-\mu)\hat{\alpha}_{n-1}$, $0 < \mu < 1$ and $\hat{\theta}_n = \mu\theta_n + (1-\mu)\hat{\theta}_{n-1}$, $0 < \mu < 1$.

The exponentially weighted moving average filter is a simple linear approximation technique which allows account to be taken of previous measurements when calculating the measurement of a quantity for the current time frame. By adjusting the parameter $\mu$, the influence of previous calculations can be reduced or increased accordingly. For small values of $\mu$, the offset and skew are dominated by the measurements at the current time. For larger values of $\mu$, the offset and skew take greater account of previous values, which can smooth the running calculation of these values and reduce the effect of spikes in the instantaneous calculations.

In other embodiments, the step of estimating the skew and offset uses a Kalman filter. For example, to estimate the skew $\alpha_n$ and the offset $\theta_n$ at time n, the Kalman filter may be applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$, wherein: $y_n = (T_{1,n} - T_{2,n}) + d_{total,n}$ is a scalar, $D_n = [1 \ T_{2,n}]$ is a 1×2 matrix, $X_n^T = [\theta_n \ \alpha_n]$ is a vector and $v_n$ is the measurement noise, and wherein: $T_{1,n}$ is the time of departure of the nth timing message as measured by the master clock; $T_{2,n}$ is the time of receipt as recorded by the slave clock on receipt of the nth timing message; and $d_{total,n}$ is the total transit delay experienced by the nth timing message, being the total of all the residence times experienced in the transparent clocks and all of the measured propagation delays determined by the transparent clocks.

The Kalman filter allows measurements of a process observed over time, containing noise and other inaccuracies, to be used to produce values (estimates) that tend to be closer to the true values of the measurements and their associated calculated values.

The method of the present aspect may include any combination of some, all or none of the above described preferred and optional features.

The method of the above aspect is preferably implemented by a slave device or a system according to the second or third aspects of this invention, as described below, but need not be.

Further aspects of the present invention include computer programs for running on computer systems which carry out the method of the above aspect, including some, all or none of the preferred and optional features of that aspect.

A second aspect of the present invention provides a slave device connected to a master device having a master clock by a network, the slave device having a slave clock and a processor, the slave device being arranged to: receive timing messages from the master device over the network, each timing message passing through at least one peer-to-peer transparent clock; record timestamps which are the times of the sending and receiving said messages according to the respective clocks; extract from each message a peer delay which is the cumulative estimate by the transparent clocks of the residence time of the message passing through each transparent clock and the propagation delay between the sending of the message by the previous transparent clock, or the master device if there is no previous transparent clock, and the receipt of the message by the transparent clock, wherein: the processor is arranged to: estimate the skew and offset of the slave clock compared to the master clock using said timestamps and said peer delay.

The slave device of this aspect can make use of the on-path timing support provided in the form of peer-to-peer transparent clocks which estimate or measure actual timing packet delays and communicate these delay measurements to slaves. The slave device can then correctly adjust its clock while compensating for the actual delay variations. This may allow the slave device to remove the negative effects that these delay variations cause in clock synchronization.

Thus the slave device of this aspect can have improved time distribution accuracy by being able to compensate for the message delivery variability across the network by using the recorded residence time(s) and propagation time delay(s) as calculated by the peer-to-peer transparent clock(s) when estimating the skew and offset.

The processor may be further arranged to synchronize the output of the slave clock to the master clock using said estimated offset and skew. By using peer link delay and PTP message residence time measurements obtained by P2P TCs, very accurate clock synchronization may be achieved, possibly to levels comparable to GPS.

In certain embodiments, the processor estimates the skew and offset using an exponentially weighted moving average filter applied to said timestamps and said residence times.

For example the processor may estimate the skew $\alpha$ as $$\alpha = \frac{(T_{1,n} - T_{1,n-1}) + (d_{total,n} - d_{total,n-1})}{(T_{2,n} - T_{2,n-1})} - 1,$$

wherein: $T_{1,n}$ is the time of departure of the nth timing message as measured by the master clock; $T_{2,n}$ is the time of receipt as recorded by the slave clock on receipt of the nth timing message; $d_{total,n}$ is the total transit delay experienced by the nth timing message, being the total of all the residence times experienced in the transparent clocks and all of the measured propagation delays determined by the transparent clocks, estimate the offset $\theta$ as $\theta=(T_{1,n}+d_{total,n})-(1+\alpha)T_{2,n}$, and update the offset and skew according to the update equations: $\hat{\alpha}_n=\mu\alpha_n+(1-\mu)\hat{\alpha}_{n-1}$, $0<\mu<1$ and $\hat{\theta}_n=\mu\theta_n+(1-\mu)\hat{\theta}_{n-1}$, $0<\mu<1$.

The exponentially weighted moving average filter is a simple linear approximation technique which allows account to be taken of previous measurements when calculating the measurement of a quantity for the current time frame. By adjusting the parameter $\mu$, the influence of previous calculations can be reduced or increased accordingly. For small values of $\mu$, the offset and skew are dominated by the measurements at the current time. For larger values of $\mu$, the offset and skew take greater account of previous values, which can smooth the running calculation of these values and reduce the effect of spikes in the instantaneous calculations.

In other embodiments, the processor estimates the skew and offset using a Kalman filter. For example to estimate the skew $\alpha_n$ and the offset $\theta_n$ at time n, the Kalman filter may be applied to: the state equation $$X_n = \begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n=D_n X_n + v_n$, wherein: $y_n=(T_{1,n}-T_{2,n})+d_{total,n}$ is a scalar, $D_n=[1\ T_{2,n}]$ is a 1×2 matrix, $X_n^T=[\theta_n \alpha_n]$ is a vector and $v_n$ is the measurement noise, and wherein: $T_{1,n}$ is the time of departure of the nth timing message as measured by the master clock; $T_{2,n}$ is the time of receipt as recorded by the slave clock on receipt of the nth timing message; and $d_{total,n}$ is the total transit delay experienced by the nth timing message, being the total of all the residence times experienced in the transparent clocks and all of the measured propagation delays determined by the transparent clocks.

The Kalman filter allows measurements of a process observed over time, containing noise and other inaccuracies, to be used to produce values (estimates) that tend to be closer to the true values of the measurements and their associated calculated values.

The slave device of the present aspect may include any combination of some, all or none of the above described preferred and optional features.

A third aspect of the present invention provides a system including: a master device having a master clock; a slave device having a slave clock and a processor; and a network connecting said master device and said slave device and having at least one peer-to-peer transparent clock, wherein the slave device is arranged to: receive timing messages from the master device over the network, each timing message passing through at least one peer-to-peer transparent clock; record timestamps which are the times of the sending and receiving said messages according to the respective clocks; the transparent clock is arranged to: estimate the residence time of each message passing through the transparent clock and the propagation delay between the sending of the message by the previous transparent clock, or the master device if there is no previous transparent clock, and the receipt of the message by the transparent clock; and communicate said residence time and said propagation delay to the slave device, and the processor is arranged to: estimate the skew and offset of the slave clock compared to the master clock using said timestamps and said peer delay.

The system of this aspect can make use of the on-path timing support provided in the form of peer-to-peer transparent clocks which estimate or measure actual timing packet delays and communicate these delay measurements to slaves. The slave device can then correctly adjust its clock while compensating for the actual delay variations. This may allow the slave devices to remove the negative effects that these delay variations cause in clock synchronization.

Thus the system of this aspect can have improved time distribution accuracy by allowing slave devices to compensate for the message delivery variability across the network by using the recorded residence time(s) and propagation time delay as calculated by the peer-to-peer transparent clock(s) when estimating the skew and offset.

The processor may be further arranged to synchronize the output of the slave clock to the master clock using said estimated offset and skew. By using peer link delay and PTP message residence time measurements obtained by P2P TCs, very accurate clock synchronization may be achieved, possibly to levels comparable to GPS.

In certain embodiments, the processor estimates the skew and offset using an exponentially weighted moving average filter applied to said timestamps and said residence times.

For example, the processor may estimate the skew $\alpha$ as $$\alpha = \frac{(T_{1,n}-T_{1,n-1})+(d_{total,n}-d_{total,n-1})}{(T_{2,n}-T_{2,n-1})} - 1$$

wherein: $T_{1,n}$ is the time of departure of the nth timing message as measured by the master clock; $T_{2,n}$ is the time of receipt as recorded by the slave clock on receipt of the nth timing message; $d_{total,n}$ is the total transit delay experienced by the nth timing message, being the total of all the residence times experienced in the transparent clocks and all of the measured propagation delays determined by the transparent clocks, estimate the offset $\theta$ as $\theta=(T_{1,n}+d_{total,n})-(1+\alpha)T_{2,n}$, and update the offset and skew according to the update equations: $\hat{\alpha}_n=\mu\alpha_n+(1-\mu)\hat{\alpha}_{n-1}$, $0<\mu<1$ and $\hat{\theta}_n=\mu\theta_n+(1-\mu)\hat{\theta}_{n-1}$, $0<\mu<1$.

The exponentially weighted moving average filter is a simple linear approximation technique which allows account to be taken of previous measurements when calculating the measurement of a quantity for the current time frame. By adjusting the parameter $\mu$, the influence of previous calculations can be reduced or increased accordingly. For small values of $\mu$, the offset and skew are dominated by the measurements at the current time. For larger values of $\mu$, the offset and skew take greater account of previous values, which can smooth the running calculation of these values and reduce the effect of spikes in the instantaneous calculations.

In other embodiments, the processor estimates the skew and offset using a Kalman filter. For example, to estimate the skew $\alpha_n$ and the offset $\theta_n$ at time n, the Kalman filter may be applied to: the state equation $$X_n = \begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$, wherein: $y_n = (T_{1,n} - T_{2,n}) + d_{total,n}$ is a scalar, $D_n = [1\ T_{2,n}]$ is a 1×2 matrix, $X_n^T = [\theta_n\ \alpha_n]$ is a vector and $v_n$ is the measurement noise, and wherein: $T_{1,n}$ is the time of departure of the nth timing message as measured by the master clock; $T_{2,n}$ is the time of receipt as recorded by the slave clock on receipt of the nth timing message; and $d_{total,n}$ is the total transit delay experienced by the nth timing message, being the total of all the residence times experienced in the transparent clocks and all of the measured propagation delays determined by the transparent clocks.

The Kalman filter allows measurements of a process observed over time, containing noise and other inaccuracies, to be used to produce values (estimates) that tend to be closer to the true values of the measurements and their associated calculated values.

The system of the present aspect may include any combination of some, all or none of the above described preferred and optional features.

Figure 6:
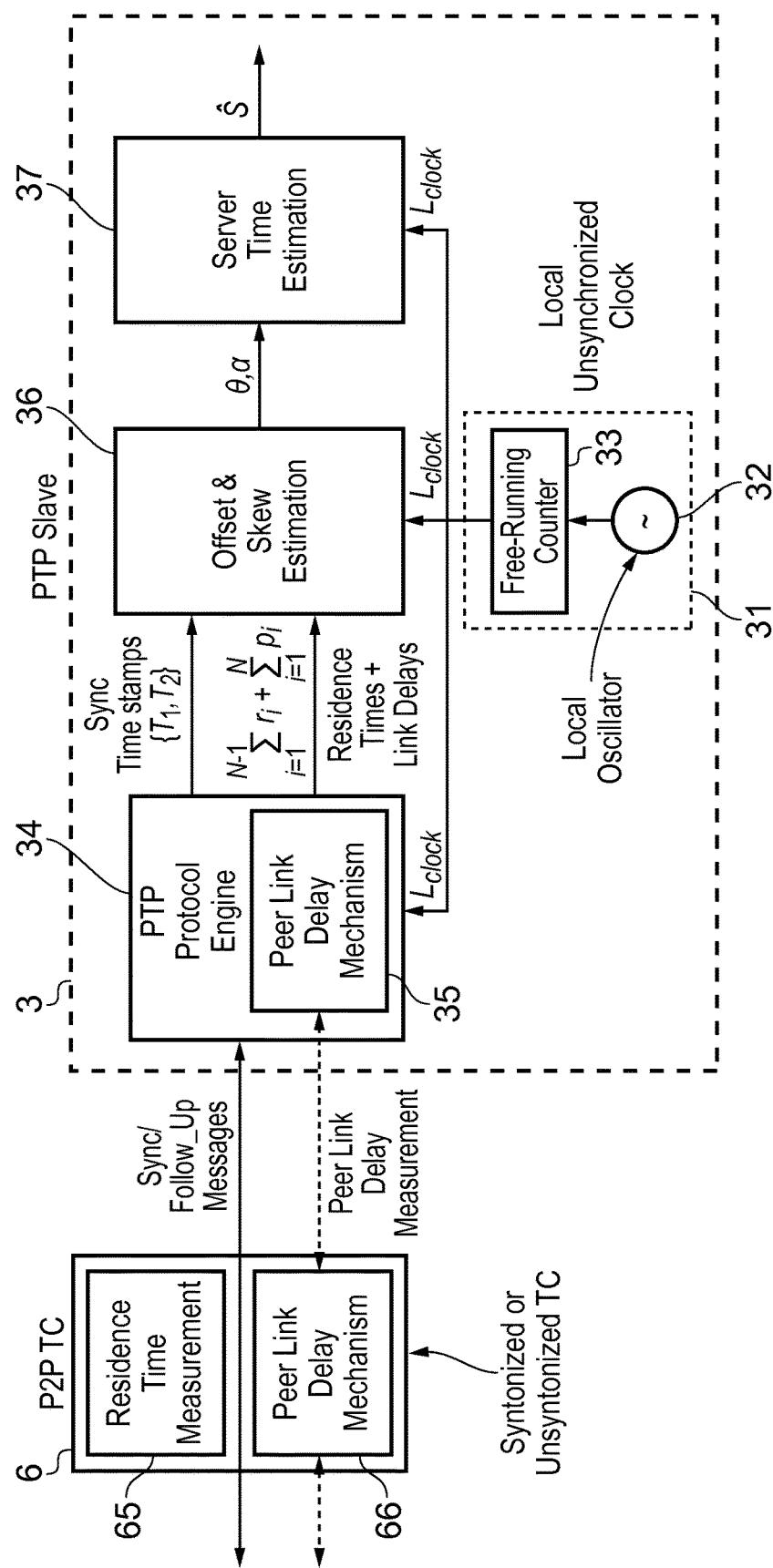
FIG. 6 shows the processing of timing messages in a system and slave device according to embodiments of the present invention.

FIG. 6 shows the main blocks of a synchronization technique according to an embodiment of the present invention as carried out at a PTP slave 3 which is a slave device according to a further embodiment of the present invention. A free running local oscillator 32 is used together with the estimated clock parameters to synthesize a synchronized local clock which is an estimated image of the server clock 4. The frequency of this client's local oscillator 32 is not adjusted, but it is allowed to free-run. This free running counter is used for timestamping and for synthesizing an image of the server clock (synchronized local clock) for the time client. The timestamps indicated in FIG. 6 at the client are with respect to this local clock.

As shown in FIG. 6, PTP messages are exchanged between the PTP master (not shown) and the PTP slave 3, passing through one or more Peer-to-Peer transparent clocks 6 on the network.

The slave 3 has a local free-running clock 31 made up of a local oscillator 32 and a free-running counter 33. The timing signal from the clock 31 is provided to each of a PTP protocol engine 34, an offset and skew estimation unit 36 and a server time estimation unit or synchronizer 37.

The PTP protocol engine 34 receives and handles the PTP message exchange between the slave 3 and the master 1, including timestamping incoming PTP messages, extracting timestamps from said messages and passing said timestamps to the offset and skew estimation unit 36. The PTP protocol engine 34 may operate under either the one-step or two-step PTP protocol.

The offset and skew estimation unit 36 receives PTP timestamps from the PTP protocol engine 34. Based on this information, the offset and skew estimation unit calculates a current estimation of the offset and skew of the slave clock 31 compared to the clock in the PTP master 1. Various methods for performing this calculation are set out the embodiments of the present invention.

The server time estimation unit 37 uses the offset and skew estimated by the offset and skew estimation unit 36 to update the output of the slave clock 31 and provides this estimate of the master time to other functions in the slave device 3.

Basic Clock Model

Figure 7:
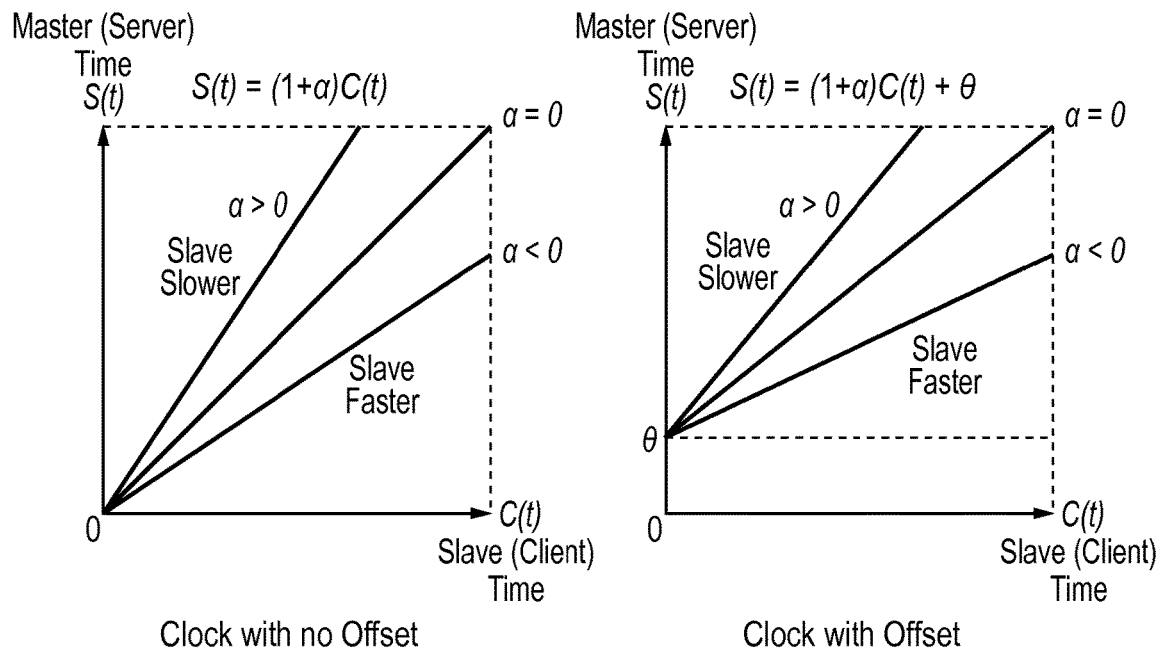
FIG. 7 illustrates the clock model used to set out methods according to embodiments of the present invention.

First we define a generalized clock offset and skew equation for our synchronization problem. We assume that at any particular time instant, the instantaneous view of the relationship between the master (server) clock with timeline $S(t)$ and the slave (client) clock with timeline $C(t)$, can be described by the well-known simple skew clock model depicted in FIG. 7, and described by the equation, $$S(t) = (1+\alpha)C(t) + \theta, \quad (2)$$

where $\theta$ is the time offset and $\alpha$ is the skew (frequency offset) which is a very small quantity in the order of parts-per-million. This snapshot is an instantaneous view of how well the two clocks are (mis)aligned. FIG. 7 illustrates the influence of $\theta$ and $\alpha$ on the alignment.

Figure 3:
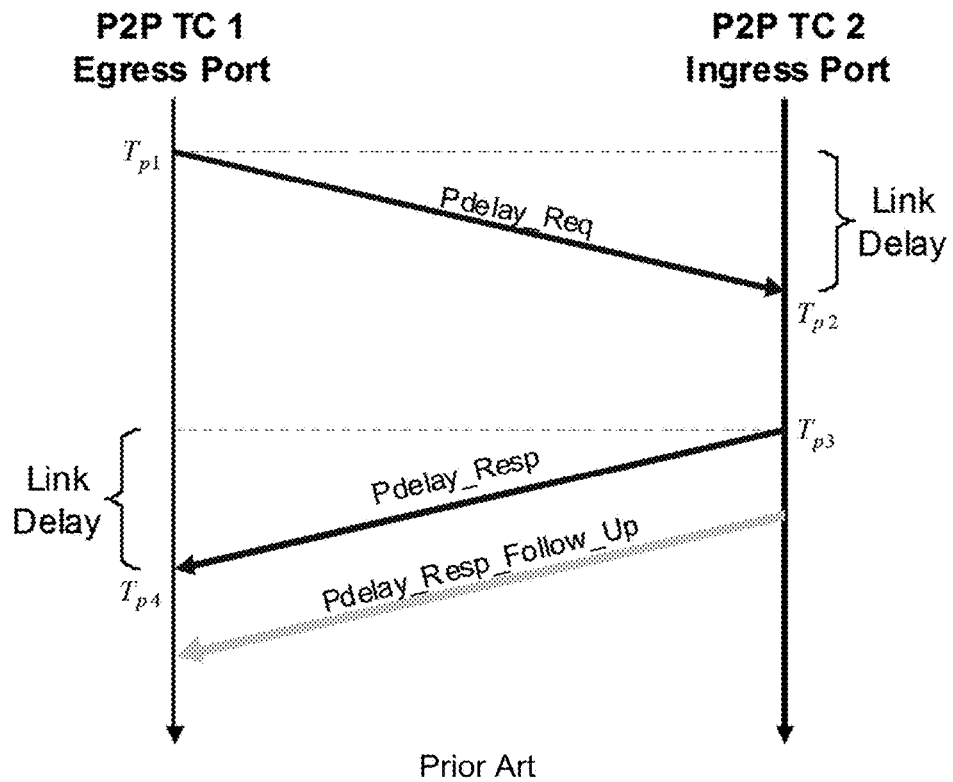
FIG. 3 shows the process of peer link delay measurement and has already been described.
Figure 4:
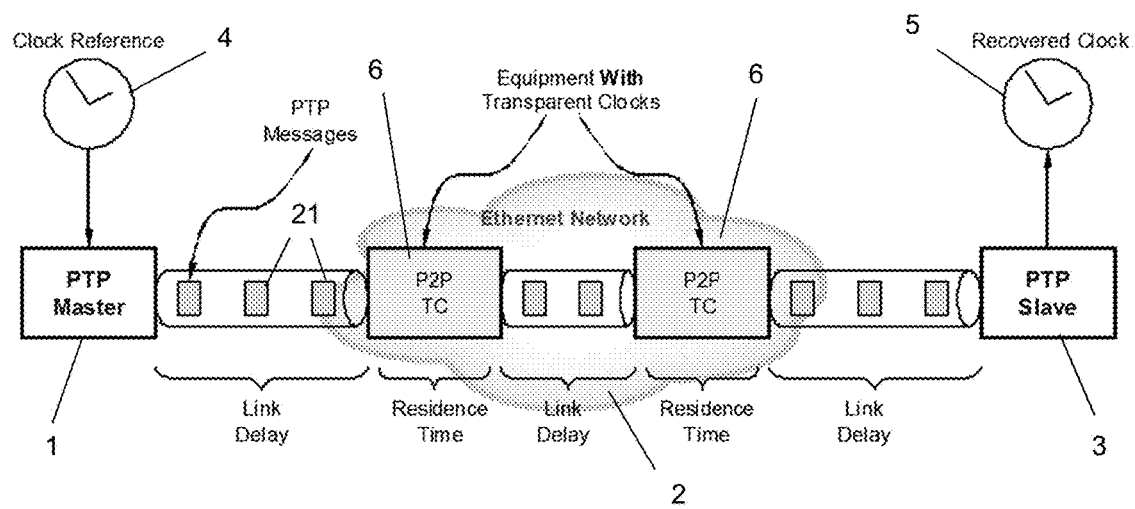
FIG. 4 shows the general principles of clock transfer using Peer-to-Peer transparent clocks and has already been described.
Figure 5:
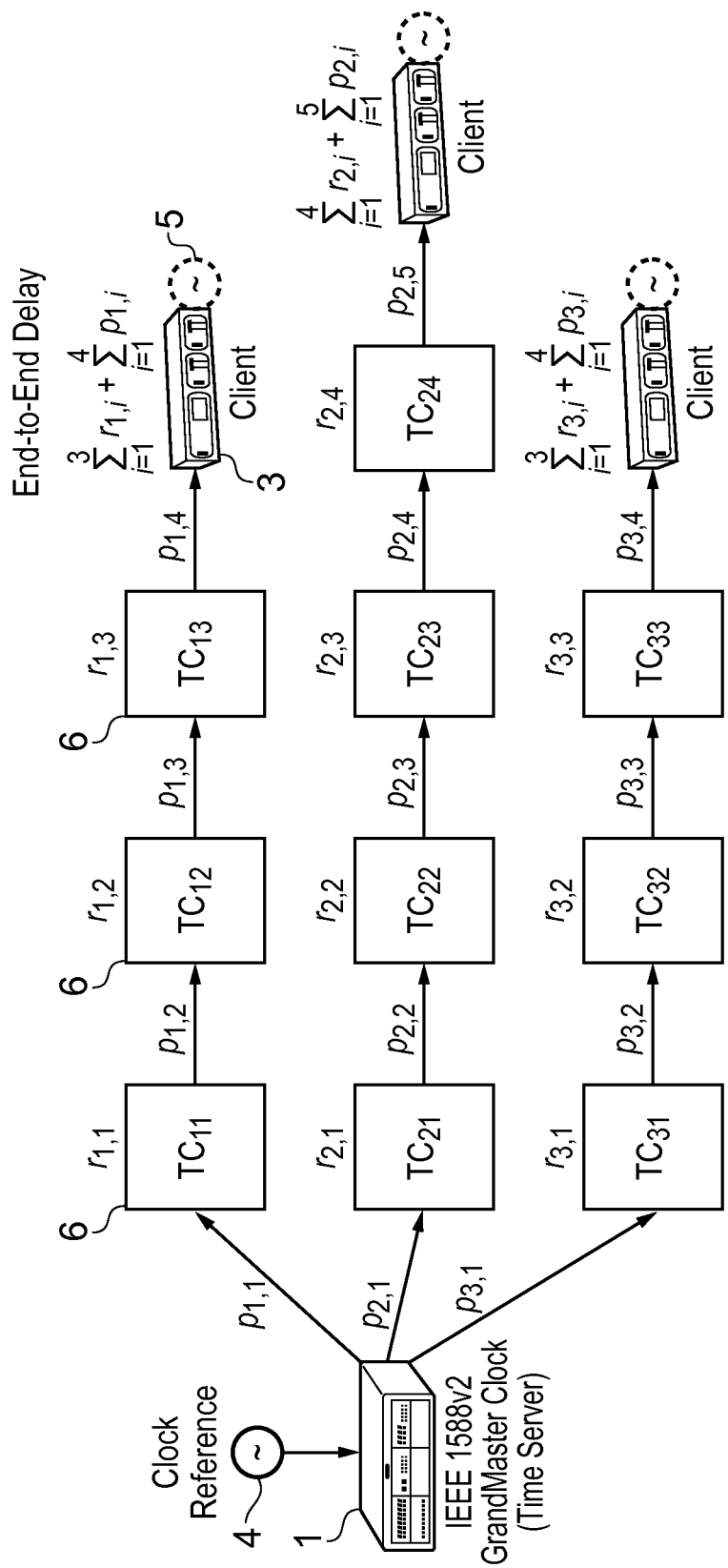
FIG. 5 shows a time distribution scheme using Peer-to-Peer transparent clocks according to an embodiment of the present invention.

The above equation can be extended to account for the case where the master clock and slave clock exchange PTP messages over a communication link with delay and with the messages passing through a network of P2P TCs. It is assumed that the nth Sync message travels from a master to a slave experiences a total transit delay $d_{total,n}$ (which is made up of all propagation delays determined by the P2P TCs using the peer delay mechanism in FIG. 3 plus the cumulative residence time experienced in all the TCs).

For the nth Sync message which departs the master with timestamp $T_{1,n} \in S(t)$ and arrives at the slave with timestamp $T_{2,n} \in C(t)$ after having experienced a delay of $d_{total,n}$, the simple skew clock model above can be extended to account for the travel time to obtain the following expression $$(T_{1,n} + d_{total,n}) = (1+\alpha)T_{2,n} + \theta \quad (3)$$

or $$\theta = (T_{1,n} + d_{total,n}) - (1+\alpha)T_{2,n} \quad (4)$$

A key assumption here is that the message exchanges occur over a period of time so small that the offset $\theta$ and skew $\alpha$ can be assumed constant over that period. Below are set out methods according to two embodiments of the present invention for computing the offset $\theta$ and skew $\alpha$ using Sync (and possibly Follow_Up) message transmissions.

Simple Linear Approximation Technique for Offset and Skew Estimation Using P2P TCs For the (n−1) and nth Sync message exchange equation (3) provides the following $$(T_{1,n-1} + d_{total,n-1}) = (1+\alpha)T_{2,n-1} + \theta \quad (5)$$

$$(T_{1,n} + d_{total,n}) = (1+\alpha)T_{2,n} + \theta \quad (6)$$

Subtracting (5) from (6) gives $$(T_{1,n} - T_{1,n-1}) + (d_{total,n} - d_{total,n-1}) = (1+\alpha)(T_{2,n} - T_{2,n-1}) \quad (7)$$

$$\alpha = \frac{(T_{1,n} - T_{1,n-1}) + (d_{total,n} - d_{total,n-1})}{(T_{2,n} - T_{2,n-1})} - 1 \quad (8)$$

The estimated skew $\alpha$ is then used to compute the clock offset $\theta$ as given in (4). To compute the server time estimate ($\hat{S}$) filtered values of the clock offset ($\theta$) and skew ($\alpha$) preferably should be used. The filtering can be done using a simple exponentially weighted moving average (EWMA) filter $$\hat{\alpha}_n = \mu\alpha_n + (1-\mu)\hat{\alpha}_{n-1},\ 0 < \mu < 1 \quad (9)$$

$$\hat{\theta}_n = \mu\theta_n + (1-\mu)\hat{\theta}_{n-1},\ 0 < \mu < 1 \quad (10)$$

$$\hat{S}_n = (1+\hat{\alpha}_n)C_n + \hat{\theta}_n \quad (11)$$

Let $C_n$ denote the current reading of the slave's local free-running clock. It should be noted here that any known or calibrated positive or negative static delay asymmetry $\theta_{static}$ that exists on the communication path from the master through the TCs to the slave can be compensated for as follows:

$$\hat{S}_n = (1+\hat{\alpha}_n)C_n + \hat{\theta}_n + \theta_{static} \quad (12)$$

where $\theta_{static} = d_f - d_r$, and $d_f$ and $d_r$ are the total static forward (master to slave) and reverse (slave to master) delays, respectively. Note that the peer delay mechanism does not capture static asymmetries between two peer nodes.

Let $\alpha_{TC}$ be the skew between peer nodes. The skew here is the frequency offset of the downstream peer with respect to the upstream peer. Then using (2), the peer link propagation delay (neglecting any asymmetry) can be obtained as follows. For a Pdelay_Req message which departs the downstream peer with timestamp $T_{p1}$ and arrives at the upstream peer with timestamp $T_{p2}$ after having a experienced delay of p, we can extend the simple skew clock model above to account for the travel time to obtain the following expression $$(T_{p1} + p) = (1 + \alpha_{TC})T_{p2} + \theta \quad (13)$$

For a Pdelay_Resp message which departs the upstream peer with timestamp $T_{p3}$ and arrives at the downstream peer with timestamp $T_{p4}$ after having a experienced delay of p, the following expression is obtained $$(T_{p4} - p) = (1 + \alpha_{TC})T_{p3} + \theta \quad (14)$$

Subtracting (14) from (13), and rearranging gives $$p = \frac{(1+\alpha_{TC})(T_{p2} - T_{p3}) - (T_{p1} - T_{p4})}{2} \quad (15)$$

Next we describe how the skew $\alpha_{TC}$ can be estimated using the Pdelay_Req and Pdelay_Resp messages. Let $\alpha_1$ denote the component of the skew that can be estimated from the Pdelay_Req message exchange. For the (n-1) and nth Pdelay_Req message exchange equation (2) provides the following:

$$(T_{p1,n-1} + p) = (1+\alpha_1)T_{p2,n-1} + \theta_{TC} \quad (16)$$

$$(T_{p1,n-1} + p) = (1+\alpha_1)T_{p2,n} + \theta_{TC} \quad (17)$$

The parameter $\theta_{TC}$ is the time offset of the downstream peer with respect to the upstream peer. Subtracting (16) from (17) gives $$(T_{p1,n} - T_{p1,n-1}) = (1+\alpha_1)(T_{p2,n} - T_{p2,n-1}) \quad (18)$$

$$\alpha_1 = \frac{(T_{p1,n} - T_{p1,n-1})}{(T_{p2,n} - T_{p2,n-1})} - 1 \quad (19)$$

Let $\alpha_2$ denote the component of the skew that can be estimated from the Pdelay_Resp message exchange. For the (n−1) and nth Pdelay_Resp message exchange we can write from (2) the following $$(T_{p4,n-1} - p) = (1+\alpha_2)T_{p3,n-1} + \theta_{TC} \quad (20)$$

$$(T_{p4,n} - p) = (1+\alpha_2)T_{p3,n} + \theta_{TC} \quad (21)$$

Subtracting (20) from (21) gives $$(T_{p4,n} - T_{p4,n-1}) = (1+\alpha_2)(T_{p3,n} - T_{p3,n-1}) \quad (22)$$

$$\alpha_2 = \frac{(T_{p4,n} - T_{p4,n-1})}{(T_{p3,n} - T_{p3,n-1})} - 1 \quad (23)$$

The skew $\alpha_{TC}$ can then be estimated from $\alpha_1$ and $\alpha_2$ as $$\alpha_{TC} = \frac{\alpha_1 + \alpha_2}{2} \quad (24)$$

The estimated skew $\alpha_{TC}$ is then used to compute the peer link propagation p as given in (15). This skew could be low-pass filtered as in (9) before use in (15). For $\alpha_{TC} = 0$, that is, when the two communicating peers are syntonized (frequency synchronized or locked), then $$p = \frac{(T_{p2} - T_{p3}) - (T_{p1} - T_{p4})}{2} = \frac{(T_{p2} - T_{p1}) - (T_{p4} - T_{p3})}{2} \quad (25)$$

Note that the correction field in the Sync (or Follow_Up) arriving at the slave sums up all the peer link propagation delay values obtained using (15) or (16) as described by the following equation $$p_{total} = \sum_{i=1}^{N} p_i \quad (26)$$

This component is the total propagation delay component in (1). The equations (16) and (17) assume symmetric links so any asymmetries communication path can be accounted for as described above in (12).

Kalman Filter Based Technique for Offset and Skew Estimation using E2E TCs

This section sets out models which can be used with a Kalman filter based technique to estimate the clock offset and skew. The Kalman filter [2] allows the use of measurements of a process observed over time, containing noise and other inaccuracies, and produce values (estimates) that tend to be closer to the true values of the measurements and their associated calculated values. The Kalman filter produces estimates of the true values of measurements and their associated calculated values by predicting a value, estimating the uncertainty of the predicted value, and computing a weighted average of the predicted value and the measured value.

In order to use the Kalman filter (to estimate the internal state of a process given only a sequence of noisy observations), the process must be modelled in accordance with the framework of the Kalman filter. Consider a state-space model described by the following pair of equations State Equation: $X_n = A_n X_{n-1} + w_n$, (27)

Measurement Equation: $y_n = D_n X_n + v_n$, (28)

where n is a nonnegative time index, $A_n$ is a known M-by-M state transition matrix, $X_n$ is the M-dimensional state (or parameter) vector, $w_n$ is an M-dimensional process noise vector which is assumed to be drawn from a zero mean multivariate normal distribution with covariance $Q_n = E[w_n w_n^T]$, $w_n \sim N(0, Q_n)$, $y_n$ is the measurement, $D_n$ is a known 1×M-dimensional measurement matrix which maps the true state space into the measurement space, $v_n$ is the measurement noise which is assumed to be zero mean Gaussian white noise with covariance $R_n = E[v_n v^T_n]$, $v_n \sim N(0, R_n)$, and T denotes transpose. It is assumed in the model that the initial state, and the noise vectors at each step $\{X_0, w_1, \ldots, w_n, v_1, \ldots, v_n\}$ are mutually independent.

The notation $\hat{X}_{n,m}$ used below represents the estimate of X at time n given observations up to, and including at time m. The Kalman filter equations is most often conceptualized as two distinct phases: Predict and Update as described below.

Predict Phase:

The predict phase uses the state estimate from the previous time step to produce an estimate of the state at the current time step.

Predicted (a priori) state estimate:

$$\hat{X}_{n,n-1} = A_n \hat{X}_{n-1,n-1} \quad (29)$$

This predicted state estimate is also known as the a priori state estimate because, although it is an estimate of the state at the current time step, it does not include observation information from the current time step.

Predicted (a priori) estimate covariance:

$$P_{n,n-1} = A_n P_{n-1,n-1} A_n^T + Q_n \quad (30)$$

Update Phase:

In the update phase, the current a priori prediction is combined with current observation information to refine the state estimate. This improved estimate is termed the a posteriori state estimate.

Innovation or measurement residual:

$$\tilde{z}_n = y_n - D_n \hat{X}_{n-1} \quad (31)$$

Innovation (or residual) covariance:

$$S_n = D_n P_{n,n-1} D_n^T + R_n \quad (32)$$

Optimal Kalman gain:

$$K_n = P_{n,n-1} D_n^T S_n^{-1} = P_{n,n-1} D_n^T [D_n P_{n,n-1} D_n^T + R_n]^{-1} \quad (33)$$

Updated (a posteriori) state estimate:

$$\hat{X}_{n,n} = \hat{X}_{n,n-1} + K_n \tilde{z}_n = \hat{X}_{n,n-1} + K_n(y_n - D_n \hat{X}_{n,n-1}) \quad (34)$$

This is the a posteriori state estimate at time n given observations up to and including at time n. The second term in the above equation is called the correction term and it represents the amount by which to correct the propagated state estimate due to our measurement. Inspection of the Kalman gain equation shows that if the measurement noise is large, $R_n$ will be large, so that $K_n$ will be small and we would not give much credibility to the measurement y when computing the next $\hat{X}$. On the other hand, if the measurement noise is small, $R_n$ will be small, so that $K_n$ will be large and we will give a lot of credibility to the measurement when computing the next $\hat{X}$.

Updated (a posteriori) estimate covariance:

$$P_{n,n} = (I - K_n D_n) P_{n,n-1} \quad (35)$$

This is the a posteriori error covariance matrix (a measure of the estimated accuracy of the state estimate).

Typically, the two phases alternate, with the prediction advancing the state until the next scheduled observation, and the update incorporating the observation. Practical implementation of the Kalman Filter requires getting a good estimate of the noise covariance matrices $Q_n$ and $R_n$.

Development of the Measurement Equation

It is assumed that a Sync message travels from a master to a slave through a network of P2P TCs experiences a total delay $d_{total,n}$ plus a stochastic delay $v_n$ (to account for all other delay components in the system). The variables $\theta_n$ and $\alpha_n$ are the offset and skew during the nth Sync message exchange. Equation (3) can then be rewritten to account for the above conditions with the following equation $$(T_{1,n} + d_{total,n} + v_n) = (1 + \alpha_n) T_{2,n} + \theta \quad (36)$$

With the above definitions in mind, the measurement equation is obtained as $$(T_{1,n} T_{2,n}) + d_{total,n} = \theta_n + \alpha_n T_{2,n} + v_n \quad (37)$$

This measurement equation can be rewritten as $$\underbrace{(T_{1,n} - T_{2,n}) + d_{total,n}}_{y_n} = \underbrace{\theta_n + \alpha_n T_{2,n}}_{D_n X_n} + v_n \quad (38)$$

where n is a nonnegative time index,
$y_n = (T_{1,n} - T_{2,n}) + d_{total,n}$ is a scalar,
$D_n = [1 \; T_{2,n}]$ is a 1×2 matrix,
$X_n^T = [\theta_n \; \alpha_n]$ is a vector, and
$v_n$ is the measurement noise.

The peer link propagation delay component in $d_{total,n}$ in the measurement equation (38) can be determined from the timestamps $\{T_{p1}, T_{p2}, T_{p3}, T_{p4}\}$ as explained by equations (13) to (25). These timestamps are obtained from the peer-delay measurement messages (see FIG. 3).

Development of the State (Process) Equation

Next the clock (process) model parameters A and $w_n$ are derived. The clock skew between two points $T_{1,n}$ and $T_{1,n-1}$ can be estimated given two clock offsets $\theta_n$ and $\theta_{n-1}$ as $$\alpha_{n-1} = \frac{\theta_n - \theta_{n-1}}{T_{1,n} - T_{1,n-1}}. \quad (39)$$

The process dynamics for the clock while accounting for process noise can be expressed as $$\theta_n = \theta_{n-1} + \alpha_{n-1}(T_{1,n} - T_{1,n-1}) + w_{\theta,n}$$

$$\alpha_n = \alpha_{n-1} + w_{\alpha,n} \quad (40)$$

where $w_n^T = [w_{\theta,n} \; w_{\alpha,n}]$ is the process noise vector which is assumed to be drawn from a zero mean normal distribution with covariance $Q_n = E[w_n w_n^T]$. The system can be described by the following two-state dynamic model $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = AX_{n-1} + w_n, \quad (41)$$

where $A_n$ is the known 2-by-2 state transition matrix. If the time between Sync messages is fixed, then, $\Delta T_n = (T_{1,n} - T_{1,n-1}) = \Delta t$ is a constant term, and $$A = \begin{bmatrix} 1 & (T_{1,n} - T_{1,n-1}) \\ 0 & 1 \end{bmatrix} = \begin{bmatrix} 1 & \Delta t \\ 0 & 1 \end{bmatrix}. \quad (42)$$

As noted in [3], the Kalman filter model includes as special cases many common estimation techniques. One example of such techniques is the multiple regression approach. This approach to estimation assumes that a time series $\{y_n\}$ is well approximated by $y_n = D_n X_n + v_n$, where $D_n$ is an 1×M-dimensional matrix of the independent regression variables, X is an M-dimensional vector of (constant) regression weights, and $v_n$ is an error term. The Kalman filter model is obtained by allowing the regression coefficients to depend on n and by adding the dynamics relation $$X_n = X_{n-1} \quad (43)$$

With this formulation, the matrix A becomes identity matrix $$A = \begin{bmatrix} 1 & 0 \\ 0 & 1 \end{bmatrix} \quad (44)$$

This (multiple regression approach [3]) formulation of the state (process) equation and matrix in (41) and (42), respectively, when used together with the measurement equation in (36) has been implemented and tested and found to work as well as the formulation in (40).

The estimated skew $\alpha_n$ and clock offset $\theta_n$ from the Kalman filter can then be used to compute the server time estimate ($\hat{S}$) according to (11). Any known or calibrated positive or negative static delay asymmetry $\theta_{static}$ that exists on the communication path from the master through the TCs to the slave can also be compensated as described in (12).

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. *ITU-T Recommendation G.8275.1/Y.1369.1*, Precision Time Protocol Telecom Profile for Time/Phase Synchronization, March 2014.
[2]. R. E. Kalman, "A New Approach to Linear Filtering and Prediction Problems," *Transaction of the ASME—Journal of Basic Engineering*, March 1960, pp. 35-45.
[3]. C. D. Pack and B. A. Whitaker, "Kalman Filter Models for Network Forecasting," *The Bell System Technical Journal*, Vol. 61, No. 1, January 1982, pp. 1-14.

All references referred to above are hereby incorporated by reference.

The invention claimed is:

1. A method for estimating the skew and offset of a slave clock in a slave device in relation to a master clock in a master device, the slave device and the master device being connected by a network, the method including the steps of:

sending timing messages from the master device to the slave device over the network, each timing message passing through at least one peer-to-peer transparent clock;

recording timestamps which are the times of the sending and receiving said messages according to the respective clocks;

in each transparent clock, estimating the residence time of each message passing through the transparent clock and the propagation delay between the sending of the message by the previous transparent clock, or the master device if there is no previous transparent clock, and the receipt of the message by the transparent clock;

estimating the total transit delay experienced by each timing message, using the total of all the residence times experienced in the transparent clocks and all of the measured propagation delays determined by the transparent clocks;

communicating said total transit delay to the slave device;

estimating the skew and offset of the slave clock using the said timestamps and said total transit delay; and synchronizing the output of the slave clock to the master clock using said estimated offset and skew; and wherein the step of estimating the skew and offset estimates the skew $\alpha$ as $$\alpha = \frac{(T_{1,n} - T_{1,n-1}) + (d_{total,n} - d_{total,n-1})}{(T_{2,n} - T_{2,n-1})} - 1$$

wherein:
$T_{1,n}$ is the time of departure of the nth timing message as measured by the master clock;
$T_{2,n}$ is the time of receipt as recorded by the slave clock on receipt of the nth timing message;
$d_{total,n}$ is the total transit delay experienced by the nth timing message, being the total of all the residence times experienced in the transparent clocks and all of the measured propagation delays determined by the transparent clocks, estimates the offset θ as θ=$(T_{1,n}+d_{total,n})-(1+\alpha)T_{2,n}$, and updates the offset and skew according to the update equations:

$\hat{\alpha}_n = \mu\alpha_n + (1-\mu)\hat{\alpha}_{n-1}$, $0<\mu<1$ and $\hat{\theta}_n = \mu\theta_n + (1-\mu)\hat{\theta}_{n-1}$, $0<\mu<1$.

2. A method according to claim 1 wherein the step of estimating the skew and offset uses an exponentially weighted moving average filter applied to said timestamps and said total transit delay.

3. A method according to claim 1 wherein the step of estimating the skew and offset uses a Kalman filter.

4. A method according to claim 3 wherein, to estimate the skew $\alpha_n$ and the offset $\theta_n$ at time n, the Kalman filter is applied to:

the state equation $$X_n = \begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$ wherein:

$y_n = (T_{1,n}-T_{2,n})+d_{total,n}$ is a scalar, $D_n = [1\ T_{2,n}]$ is a 1×2 matrix, $X_n^T = [\theta_n\ \alpha_n]$ is a vector and $v_n$ is the measurement noise, and wherein:

$T_{1,n}$ is the time of departure of the nth timing message as measured by the master clock;

$T_{2,n}$ is the time of receipt as recorded by the slave clock on receipt of the nth timing message; and $d_{total,n}$ is the total transit delay experienced by the nth timing message, being the total of all the residence times experienced in the transparent clocks and all of the measured propagation delays determined by the transparent clocks.

5. A slave device connected to a master device having a master clock by a network, the slave device having a slave clock and a processor, the slave device being arranged to:

receive timing messages from the master device over the network, each timing message passing through at least one peer-to-peer transparent clock;

record timestamps which are the times of the sending and receiving said messages according to the respective clocks;

extract from each message a total transit delay which is the cumulative estimate by the transparent clocks of the residence time of the message passing through each transparent clock and the propagation delay between the sending of the message by the previous transparent clock, or the master device if there is no previous transparent clock, and the receipt of the message by the transparent clock, wherein:

the processor is arranged to:

estimate the skew and offset of the slave clock compared to the master clock using said timestamps and said total transit delay; and wherein the processor is further arranged to synchronize the output of the slave clock to the master clock using said estimated offset and skew; and wherein the processor estimates the skew α as $$\alpha = \frac{(T_{1,n}-T_{1,n-1})+(d_{total,n}-d_{total,n-1})}{(T_{2,n}-T_{2,n-1})} - 1$$

wherein:

$T_{1,n}$ is the time of departure of the nth timing message as measured by the master clock;

$T_{2,n}$ is the time of receipt as recorded by the slave clock on receipt of the nth timing message;

$d_{total,n}$ is the total transit delay experienced by the nth timing message, being the total of all the residence times experienced in the transparent clocks and all of the measured propagation delays determined by the transparent clocks, estimates the offset θ as θ=$(T_{1,n}+d_{total,n})-(1+\alpha)T_{2,n}$, and updates the offset and skew according to the update equations:

$\hat{\alpha}_n = \mu\alpha_n + (1-\mu)\hat{\alpha}_{n-1}$, $0<\mu<1$ and $\hat{\theta}_n = \mu\theta_n + (1-\mu)\hat{\theta}_{n-1}$, $0<\mu<1$.

6. A slave device according to claim 5 wherein the processor estimates the skew and offset using an exponentially weighted moving average filter applied to said timestamps and said total transit delay.

7. A slave device according to claim 5 wherein the processor estimates the skew and offset using a Kalman filter.

8. A slave device according to claim 7 wherein, to estimate the skew $\alpha_n$ and the offset $\theta_n$ at time n, the Kalman filter is applied to:

the state equation $$X_n = \begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$ wherein:

$y_n = (T_{1,n}-T_{2,n})+d_{total,n}$ is a scalar, $D_n = [1\ T_{2,n}]$ is a 1×2 matrix, $X_n^T = [\theta_n\ \alpha_n]$ is a vector and $v_n$ is the measurement noise, and wherein:

$T_{1,n}$ is the time of departure of the nth timing message as measured by the master clock;

$T_{2,n}$ is the time of receipt as recorded by the slave clock on receipt of the nth timing message; and $d_{total,n}$ is the total transit delay experienced by the nth timing message, being the total of all the residence times experienced in the transparent clocks and all of the measured propagation delays determined by the transparent clocks.

9. A system including:

a master device having a master clock;

a slave device having a slave clock and a processor; and a network connecting said master device and said slave device and having at least one peer-to-peer transparent clock, wherein the slave device is arranged to:
  receive timing messages from the master device over the network, each timing message passing through at least one peer-to-peer transparent clock;
  record timestamps which are the times of the sending and receiving said messages according to the respective clocks;
the transparent clock is arranged to:
  estimate the residence time of each message passing through the transparent clock and the propagation delay between the sending of the message by the previous transparent clock, or the master device if there is no previous transparent clock, and the receipt of the message by the transparent clock; and
  communicate said residence time and said propagation delay to the slave device, and
the processor is arranged to:
  estimate the total transit delay experienced by each timing message, using the total of all the residence times experienced in the transparent clocks and all of the measured propagation delays determined by the transparent clocks; and
  estimate the skew and offset of the slave clock compared to the master clock using said timestamps and said total transit delay; and
wherein the processor is further arranged to synchronize the output of the slave clock to the master clock using said estimated offset and skew; and
wherein the processor estimates the skew $\alpha$ as $$\alpha = \frac{(T_{1,n} - T_{1,n-1}) + (d_{total,n} - d_{total,n-1})}{(T_{2,n} - T_{2,n-1})} - 1$$

wherein:
  $T_{1,n}$ is the time of departure of the nth timing message as measured by the master clock;
  $T_{2,n}$ is the time of receipt as recorded by the slave clock on receipt of the nth timing message;
  $d_{total,n}$ is the total transit delay experienced by the nth timing message, being the total of all the residence times experienced in the transparent clocks and all of the measured propagation delays determined by the transparent clocks,
  estimates the offset $\theta$ as $\theta = (T_{1,n} + d_{total,n}) - (1+\alpha)T_{2,n}$,
  and updates the offset and skew according to the update equations:

$$\hat{\alpha}_n = \mu\alpha_n + (1-\mu)\hat{\alpha}_{n-1},\ 0<\mu<1\ \text{and}$$

$$\hat{\theta}_n = \mu\theta_n + (1-\mu)\hat{\theta}_{n-1},\ 0<\mu<1.$$

10. A system according to claim 9 wherein the processor estimates the skew and offset using an exponentially weighted moving average filter applied to said timestamps and said total transit delay.

11. A slave device according to claim 9 wherein the processor estimates the skew and offset using a Kalman filter.

12. A slave device according to claim 11 wherein, to estimate the skew $\alpha_n$ and the offset $\theta_n$ at time n, the Kalman filter is applied to:
  the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and
  to the measurement equation $y_n = D_n X_n + v_n$
wherein:
  $y_n = (T_{1,n} - T_{2,n}) + d_{total,n}$ is a scalar,
  $D_n = [1\ T_{2,n}]$ is a 1×2 matrix,
  $X_n^T = [\theta_n\ \alpha_n]$ is a vector and
  $v_n$ is the measurement noise, and wherein:
  $T_{1,n}$ is the time of departure of the nth timing message as measured by the master clock;
  $T_{2,n}$ is the time of receipt as recorded by the slave clock on receipt of the nth timing message; and
  $d_{total,n}$ is the total transit delay experienced by the nth timing message, being the total of all the residence times experienced in the transparent clocks and all of the measured propagation delays determined by the transparent clocks.

* * * * *